EDGAR WARREN COLEHOWER
INVENTOR

United States Patent Office 3,419,434
Patented Dec. 31, 1968

3,419,434
SOLAR CELL ASSEMBLIES
Edgar Warren Colehower, Baltimore, Md., assignor to Martin Marietta Corporation, New York, N.Y., a corporation of Maryland
Filed July 21, 1964, Ser. No. 384,086
5 Claims. (Cl. 136—89)

ABSTRACT OF THE DISCLOSURE

A metal sheet is formed in stair-like, or zig-zag corrugations, defining two sets of parallel webs. The surfaces of one set of webs are covered with solar cells in heat transferring relationship. The surfaces of the other set of webs are reflective for reflecting incident radiation onto the solar cells. Heat from the solar cells is transmitted through the metal sheet and radiated from the reflective surfaces of the other set of webs. The reflective surfaces may be given a coating that is transparent to radiant energy within the useful range of the solar cells but that is highly emissive to radiant energy outside that range.

---

This invention relates to apparatus for the conversion of solar radiation into electric energy and more particularly to solar cell arrays and assemblies for providing a source of electric energy on artificial space satellites or the like. The term "solar cells" as used herein is intended to denote those semiconductor elements exhibiting photovoltaic properties and which are useful in the conversion of radiant energy from the sun into electric energy.

By any terrestrial standards of comparison the cost of electric power on space satellites is very high. Due to the difficulty and complexity of launching a mass into an orbit outside of the envelope of the earth's atmosphere, the cost of the electric power increases as the mass of the system responsible for the generation of the power increases. In a solar probe satellite wherein electric power is generated by solar cells in response to high intensity solar radiation, the cost of the electric energy generated may range typically from $500 to $2,000 per watt delivered by the solar cell system.

Efficiency of energy conversion is a key factor in the determination of cost of electrical power in an artificial space satellite. Any reliable increase in the efficiency of energy conversion from the elements of the solar cell system would, of course, reduce the number of elements required to produce a given power output. A principal object of this invention is therefore to improve the total conversion efficiency of solar cell power sources to reduce the cost per watt of electric power delivered thereby.

One of the principal factors which influences the efficiency of solar cell energy converters is the temperature of the cell element. As the temperature of a typical solar cell is reduced, its efficiency increases, except at the lower limits of the temperature scale. Conversely, the higher the temperature of the cell, the lower its efficiency until, at a certain elevated temperature region, irreversible thermal damage to the cell occurs. Any reduction in the operating temperatures of the cells in a solar cell system therefore reduces the number or total area of solar cells required to power a particular function, improved the reliability of the solar cell system by minimizing the possibility of damage to the cells, and reduces the cost per watt of electric energy delivered. However, the environmental conditions under which most solar cells are intended to operate involve the interception of very substantial radiant energies and the consequent conversion of much of that radiant energy into thermal energy. This naturally tends to raise the temperature of the cells in the system.

It is therefore a further object of this invention to provide novel solar cell systems having substantially improved efficiencies in the interception of radiant energy and in the dissipation of thermal energy.

The use of solar energy conversion elements in artificial space satellites requires not only that the elements possess a high efficiency and reliability, but also that their high efficiency and reliability be maintained under a range of environmental conditions far beyond those encountered in more coventional applications. Consequently, a still further object of the invention is the provision of a unique lightweight solar cell system capable of efficient operation when subjected to a wide range of extraterrestrial conditions including the exposure of the system to greatly varying intensities of solar radiation and also to varying degrees of thermal radiation from other sources.

This invention contemplates the provision of solar cell arrays and assemblies which are uniquely constructed to promote a high rate of energy absorption and conversion while enhancing the heat dissipation properties of the solar cell array in a structure which is lightweight. When conditions require that the rate of energy absorption be decreased the practice of this invention permits not only a reduction in the amount of solar radiation intercepted by the structure but also an increase in its thermal radiation efficiency.

By way of a brief summary of one embodiment of this invention, a thin supporting substrate of sheet aluminum is corrugated to a zigzag configuration resembling a series of steps. The substrate defines two sets of intersecting generally planar web sections in which each of the planar sections in a set is parallel to all other planar sections in the same set. The corrugated substrate has therefore opposite corrugated sides of which one side is considered to be a radiation-receiving surface and while the other side serves as a surface primarily for the reradiation of thermal energy. On the radiation-receiving side of the corrugated substrate and affixed to one of the sets of mutually parallel plane surfaces, is mounted an array of solar cells having the capability of converting solar radiation into electric energy. The solar cells, are interconnected to furnish electric currents at potentials depending, among other factors, on the integrated intensity of the solar radiation over the entire active surfaces of the cell. The separate cells of the array are affixed in intimate thermal contact with the underlying substrate, which has excellent thermally conductive properties, such that heat from the solar cell elements is conducted through the substrate to adjacent portions thereof.

The radiation reception surfaces of the other set of planar portions of the substrate are polished to a high luster for purposes of reflecting solar radiation onto the adjacent solar cell surfaces. These polished surfaces, it is to be noted, are likewise mutually parallel and each forms an included angle with an adjacent portion of the substrate supporting the solar cell. The polished reflecting surfaces are preferably coated with a thin film of a filter-like material which imparts a high emissivity to the reflecting surfaces for certain electromagnetic wavelengths. This film is transparent throughout at least that range of radiant energy wavelengths capable of producing an effective solar cell response, while possessing a high emissivity for other wavelengths of radiation.

In one embodiment of the invention the entire reverse surface of the array, which as previously mentioned is primarily for the purpose of reradiation of thermal energy, is coated with a layer having a high emissivity to approximate the nature of a black body surface. In use, an assembly of this nature is caused to assume different angularities with respect to the direction of incident solar radiation, the angularity of the entire array being dependent upon the intensity of the solar radiation in the region of space occupied by the array. In general, the blackened rear surface of the assembly is oriented toward deep space for the reradiation of thermal energies from the substrate to control the temperature of the solar cell elements.

Although the invention is not to be limited except by the appendant claims, further details of the invention as well as additional objects and advantages will be more readily perceived in connection with the following more detailed description taken together with the accompanying drawing in which:

Figure 1:
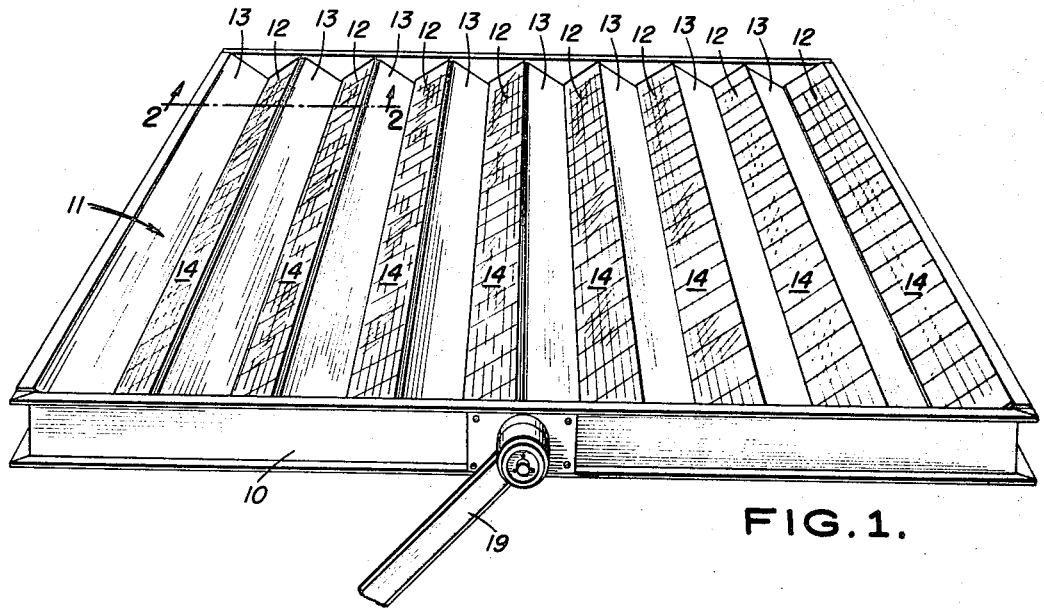
FIGURE 1 is a perspective view of a solar cell array assembly constructed in accordance with the principles of this invention.

The solar cell array illustrated in the perspective view of FIGURE 1 is constructed in accordance with the principles of this invention to incorporate improved cell cooling and sunlight concentrating features which greatly improve the efficiency of energy conversion of which the array is capable. As seen in this view from the radiation-receiving side of the array, the assembly comprises a rectangular frame 10 within which is supported a heat conductive base member 11 preferably formed of sheet aluminum and corrugated to a stair-like configuration. The corrugations in the sheet metal base member 11 divide this member into two interleaved sets of generally planar webs 12 and 13. All of the planar webs 12 in one set are mutually parallel being disposed to form a series of identical included angles with respect to the mutually parallel planar webs 13 of the other set.

The sheet metal base member 11 acts as a substrate for strips of solar cells 14 which substantially cover the entire radiation-receiving surface of the first set of webs 12. The radiation receiving surfaces of the webs 13 facing the adjacent cell-covered strips 12 are, however, polished to a high luster to act as reflectors to redirect useful radiant energy impinging thereon onto the adjacent cell surfaces. The solar cell strips 14 are therefore capable of intercepting not only direct solar radiation, but also reflected radiation. The proportions and amounts of direct and reflected radiation intercepted by the solar cell surfaces in any particular region of space depends, as will be explained more fully hereinafter, upon the angular orientation of the energy receiving surfaces of the solar cells and reflectors with respect to the incident solar light flux.

The opposite surfaces 15 and 16 of the supporting webs 12 and 13, as seen in the cross-sectional view of FIG-URE 2, are preferably covered with a coating of high emissivity to impart a high radiation efficiency to that side of the structure. In this illustration it can be seen that the frame 10 surrounding the array assembly is open not only on the upper radiation-receiving side, but also on the lower radiating side of the assembly to expose the radiating surfaces 15 and 16 fully. The base member 11 is provided at opposite ends with extended lips which overlie and are attached as by welding to a portion of frame 10. At its sides the base member 11 is affixed and supported on zigzag profile of supporting brackets 18 spot welded to the inner sides of the frame 10. The resulting structure, in addition to possessing desirable energy conversion properties, is remarkably lightweight and rigid, partly because of the corrugated configuration of the base member 11.

The array assembly, thus far partially described, is not intended to be fastened onto a surface when in use with only one radiation-receiving side exposed. Instead, the advantages of the invention are best realized when the array is mounted apart from adjacent surfaces such as on a positionable boom or the like represented by boom arm 19 in FIGURE 1 for controllable orientation such that the upper radiation-receiving surfaces are directed to receive radiation at an optimum angle, while the lower radiating surfaces 15 and 16 view only deep space for optimum radiating efficiency. It is to be understood, however, that the particular means for selecting an angular orientation of the array assembly with respect to the radiant energy being received is not itself a part of this invention and for that reason the mechanical details of the positionable boom 19 have not been illustrated or described. In fact, any appropriately hinged, pivoted or articulated linkages which are capable of varying the orientation of the array assembly and maintaining it at a selected angle with respect to the ambient solar radiation will be appropriate.

Figure 2:
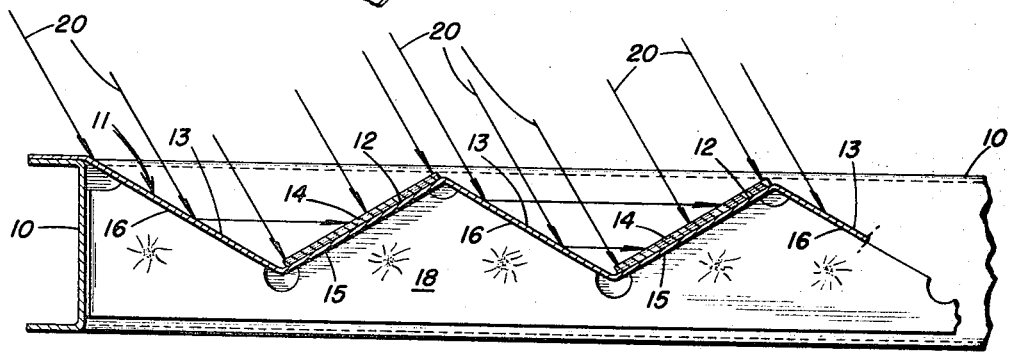
FIGURE 2 is a partial cross-sectional view taken on line 2—2 of FIGURE 1.

The construction selected for illustration in FIGURES 1 and 2 is designed such that the reflector surfaces 13 are approximately equal in area to the exposed surfaces of the solar cell strips 14 with an included angle of 120° between reflector and cell. With this configuration the maximum interception of solar radiation, represented by arrows 20 in FIGURE 2, occurs when the assembly is oriented such that the solar cell strips 14 are normal to the direction of directly received radiation. At this orientation practically all of the radiation incident on a reflector surface 13 is reflected onto the adjacent solar cell surfaces and is distributed evenly thereon.

The practice of this invention is not limited to the use of any one form of solar cell. That term as used herein is intended to apply to photovoltaic energy converters of any type, such as those employing silicon P/N, silicon N/P, gallium arsenide, cadmium suphide or similar solid state devices. For some systems gallium arsenide cells may be preferred because they perform at higher temperatures than silicon cells. They also appear to possess superior resistance to damage at quite high radiation intensities. At present, however, the use of silicon N/P is to be preferred for most missions because of the greater experience which has been gained with this material and because cells of this type have attained a high degree of acceptance.

Figure 3:
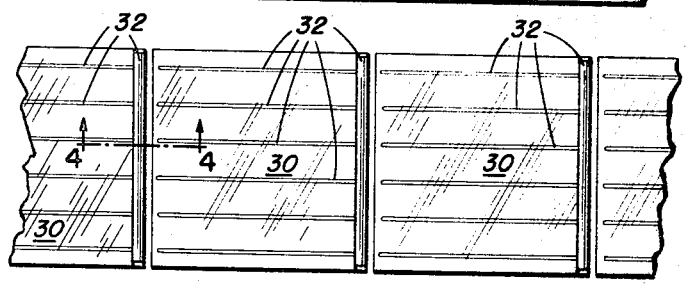
FIGURE 3 is a plan view of a strip of cells mounted on the assembly shown in FIGURE 1.
Figure 4:
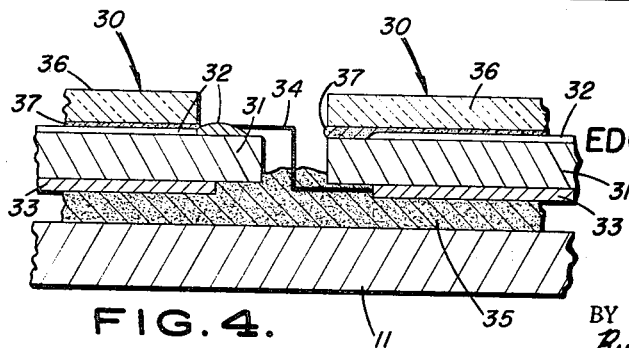
FIGURE 4 is a partial cross-sectional view taken on line 4—4 of FIGURE 3.

One manner in which the cells may be applied to the substrate is shown in FIGURE 3 and FIGURE 4 wherein is represented a series of individual solar cells 30 extending the length of one of the webs of the panel. Each cell includes a wafer 31 of semi-conductive material, in this case silicon, upon which is applied a conductive terminal 32 including grid-like conductors extending across the upper surface of the cell from a bus bar at the edge. The other terminal 33, as best seen in FIGURE 4, is beneath the silicon wafer 31 in intimate contact therewith. The cells may be connected in series to add the potentials produced by the series of cells by connecting a flexible conductor 34 between the upper terminal 32 of one cell and the lower terminal 33 of the next adjacent cell. The lower terminals 33 of the cells must, of course, be electrically isolated from each other and from the conductive mounting base. This electrical isolation is effected by employing a non-conductive cement layer 35 between the silicon cells and the base to fasten the cells to the base or by adding an insulating coating on the base. This electrically insulating layer is, of course, as thin as possible to promote the transfer of thermal energy from the silicon wafer 31 to the base, but without sacrificing the necessary electrical isolation.

It is advisable to protect the solar cells against energetic particle radiation damage and to prevent electromagnetic radiation outside the range of useful wavelengths from reaching the cells. Toward these ends a cover slip 36 including thin film coatings is preferably attached by a transparent cement 37 to the surface of each cell. The mass of the cover slip reduces energetic particle radiation damage. The cover slip 36 must be transparent to those wavelengths useful in the photovoltaic conversion. For silicon cells the range of spectral response lies mostly in the radiant energy wavelengths between 0.4 and 1.2 microns. The thin film coating of the cover slip 36 should reject the transmission of as many wavelengths as possible outside the spectrally sensitive range of the solar cells 30. Cover slips of glass, quartz, and sapphire of appropriate thickness have been employed for similar purposes.

Each of the reflectors 13 has two principal functions. One of which is to reflect the light impinging on its surface toward the adjacent solar cell. The other function of the reflector is to radiate heat from the solar cell array. Part of this heat is conducted to the reflector from the solar cell through the corrugated base member 11 and part is generated in the reflector due to its inherent losses. Coating materials are preferably used on the reflecting surfaces of the reflectors 13 to regulate the radiant heat transfer by control of the three basic optical properties: Reflectance, Absorptance, and Emittance. Energy incident upon the reflector surface will, of course, be reflected or absorbed. If it is reflected, the energy is diverted and will not cause a rise in temperature. However, if the energy is absorbed, it must be reradiated at least at the rate at which it is absorbed or a temperature rise in the structure will occur. The temperature required to result in a reradiation of all absorbed heat is dependent upon the emittance of the surface and upon the exposed area.

The solar energy incident on a surface is comprised mostly of short wavelengths whereas, at equilibrium temperature, the absorbed energy of a body is reradiated at long wavelengths. Consequently, the ability of a surface material to radiate heat often differs from its ability to absorb radiant energy.

Polished metals coated with certain transparent materials tend to remain relatively cool in the solar radiation of space. Aluminum, as is generally appreciated, has proven to be an excellent reflecting material for radiant energy from one end of the spectrum to the other and partly for this reason as well as for its comparatively light weight and high thermal conductivity it is preferred as a combination substrate and reflector material. Preferably, however, the aluminum reflector surface is coated with a layer of oxidized silicon monoxide deposited from the vapor state upon the aluminum reflector surface to an optical thickness of about 3.5 microns.

Silicon monoxide evaporated under high vacuum conditions condenses principally as SiO and is dark in appearance. However, by depositing silicon monoxide at a pressure of $3 \times 10^{-4}$ torr maintained by means of an atmospheric air leak, films substantially transparent into the ultraviolet region of the spectrum are produced. Such films are believed to consist of a mixture of silicon oxides.

Another type of coating which has proved invaluable in the practise of this invention is a visibly transparent film of aluminum oxide about 8.4 microns in optical thickness produced chemically upon the surface of the aluminum reflector. Continuous films of either of these materials are transparent to radiation in the visible region and are substantially opaque in the infrared region of the spectrum. Therefore, polished aluminum with a transparent coating of silicon monoxide or of aluminum oxide will have a double surface effect because of the fact that the polished aluminum reflects that portion of the solar radiation which penetrates the oxide coating, whereas the balance of the energy absorbed by the coating on the reflector surface is subject to reradiation in all directions. Hence a screening effect is imposed upon a substantial amount of the radiation received on the solar cell surfaces and much of the radiant energy which the cells are incapable of converting to electrical energy is reradiated to space. The effect of such coatings on the reflector surfaces is therefore to reduce the equilibrium temperature of the structure to a level below that which it would attain without such coatings on the reflectors.

The nature of the coating on the rear of radiating surfaces of the corrugated base may differ from the coatings on the cells and on the reflectors on the other side. The important thing is for the rearward surface to radiate with properties as close to those of a black body as are obtainable. Generally, any good, adherent highly emissive surface coating is suitable for this purpose.

Referring back to FIGURE 2 and to the light rays 20 indicated therein, certain relationships are to be observed. In that illustration the orientation of the array with respect to the sun is illustrated such that the incident solar radiation is normal to the reception surface of the solar cells. The angularity of the reflecting surafces in this embodiment, furthermore, are such that substantially all the radiation reflected from the reflecting surfaces is directed at the adjacent solar cells. This configuration is recommended for space missions at or adjacent to the earth's orbit. With an array of the type illustrated as the first embodiment of this invention wherein the total area of reflecting surfaces is approximately equal to the total area of the solar cells with an included angle between cell and reflector of approximately 120 degrees, any departure of the array from its indicated orientation results in a linear reduction in the power output of the system. The reason for this is that a change in the angular orientation in the array simultaneously reduces not only the total amount of flux directly intercepted by the solar cells but also the amount of reflected flux which reaches the solar cells.

For example, it is apparent that a movement of the solar cell array either clockwise or counterclockwise from the orientation with respect to the solar radiation 20 indicated in FIGURE 2 will result in a reduction in the area of flux directly intercepted by each solar cell strip 14. In addition, clockwise movement of the solar cell array would result in a smaller area of flux being intercepted by each reflector surface 13. On the other hand, although a counterclockwise rotation of the assembly would result in a greater total flux being intercepted by the reflector surfaces, an increasing amount of the reflected flux will be spilled into space without reception by the solar cell surfaces. Consequently, a graph of the power output of such a solar cell array shows a sharply peaked response at one particular orientation and a linear reduction in power output of the array with angular displacements in either direction from that orientation. In some missions a highly directional response may be desirable. In other missions it may be preferable to have a flatter response with less criticality in the exact angular orientation of the array to produce a given power output.

Figure 5:
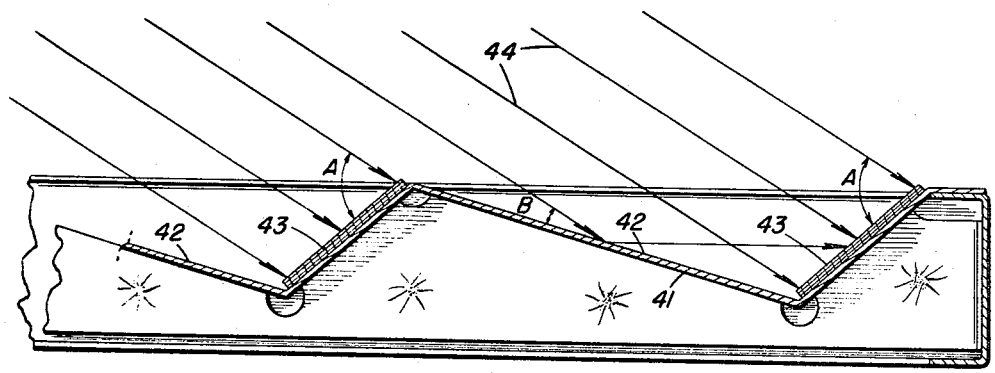
FIGURE 5 is a cross-sectional view similar to FIGURE 2 illustrating a modification of the invention and showing solar radiation impinging on the array at a particular angle.

An alternate embodiment of the invention illustrated in FIGURE 5 is constructed such that variations in the electrical output of the assembly in response to angular deviations from its optimum solar orientation are smoother and less highly peaked than in the case of the previous example. This embodiment, shown in a view similar to that of FIGURE 2, is provided with a corrugated substrate support 41 having plane reflector surfaces 42 which are slightly more than twice the width of the solar cells 43. The included angle between the reflectors 42 and their respectively adjacent solar cells 43 is again 120 degrees in this example, although it should by now be apparent that the included angle can be varied to suit different design criteria. In this illustration, as in the discussion of the preceding embodiment, it may be seen that substantially all of the radiant flux 44 reflected by the reflectors 42 is directed onto the adjacent solar cell surfaces 43. It is to be noted, however, that that portion of the solar flux 44 which is incident directly upon the surface of the solar cells 43 without prior reflection is not normal to the plane surface of the solar cells 43. Instead, the directly received radiant flux is received on the surface of the solar cells 43 at an angle A which lies closer to that of the reflector surfaces 42. In FIGURE 5 the angle A at which the directly received flux strikes the solar cell surfaces is 77 degrees and the angle B at which the flux strikes the reflector surfaces is 17 degrees.

If the structure shown in FIGURE 5 is rotated counter-clockwise to increase angles A and B by an incremental angle, there will be a twofold effect upon the quantity of solar flux intercepted by the solar cells 43. On the one hand, such a rotation would tend to increase the amount of direct flux received by the solar cells 43 by virtue of the increased solid angle of flux intercepted by the solar cell surfaces as the angle A approaches ninety degrees. Reflectors 42 would also intercept a greater amount of solar flux, but the higher angle of incidence B of the flux upon the reflector surfaces would result in more of the reflected radiant flux being reflected into space past the solar cells 43. Consequently, the solar cells 43 would receive more direct flux and less reflected flux as a result of such an angular displacement. It can be seen, therefore, that the output of an array so constructed reaches a maximum at a particular angular orientation, but that this maximum falls off gradually as the array is displaced angularly in one direction or the other from the maximum effective orientation.

For those radiation environments in which maximum effective reradiation of thermal energy from the solar cell array is desired, that is to say, when the solar flux is so intense that the power output of the array would tend to drop substantially because of elevated cell temperatures, the array is preferably positioned such that the sun's rays are parallel to the reflector surfaces 42 and impinge only upon the solar cells 43 as illustrated in FIGUURE 6. In the latter figure the angle of incidence A' of solar radiation upon the solar cells 43 is 60 degrees. At this angular orientation the reflectors 42 intercept none of the solar radiation and act exclusively as radiators to dissipate heat from the solar cell array assembly.

Figure 6:
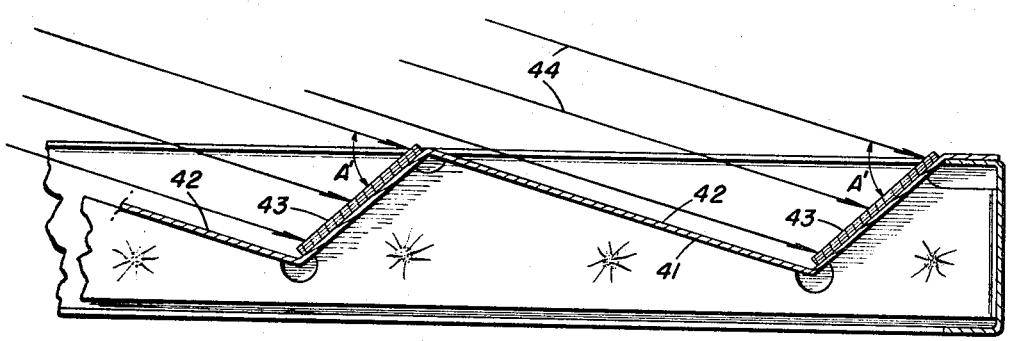
FIGURE 6 is a view of the modification shown in FIG-URE 5 showing the radiation impinging on the array from a second angle.
Figure 7:
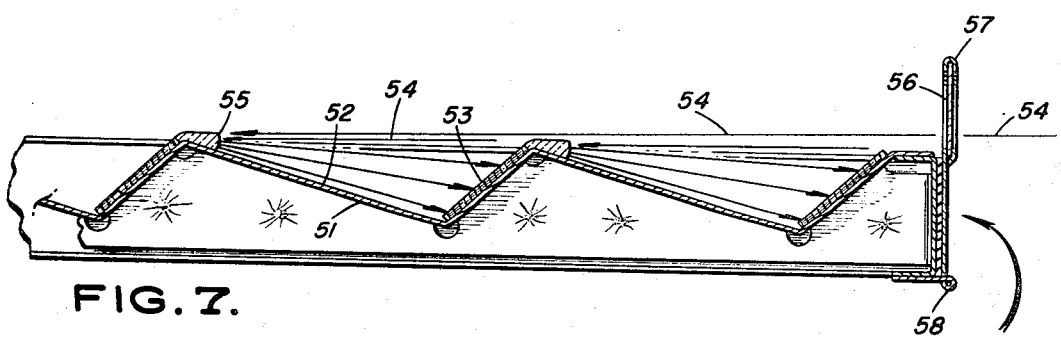
FIGURE 7 is a cross-sectional view of a still further embodiment of the invention especially adapted for missions in regions of very intense solar radiation.

There are other methods of adapting the stepped panel array to missions of even more intense solar radiation. One way this may be accomplished is illustrated in FIGURE 7 wherein an array similar to that illustrated in FIGURES 5 and 6 is shown but with certain modifications to the structure. Once again the corrugated web 51 incorporates reflector surfaces 52 facing the solar cells 53 across an included angle therebetween. At the angular orientation of the array shown in this illustration, however, the reflecting qualities of the reflectors 52 are not employed, since the incident solar radiation 54 approaches the solar cell assembly at a low grazing angle. A small but elongated planoconvex reflector 55 is positioned at each apex between a solar cell 53 and a reflector 52 to intercept the low-angle solar flux 54 and to reflect and disperse the solar flux over the active surfaces of the solar cells 53. At the indicated orientation of the solar panel shown in FIGURE 7 most of the structure of the assembly is shielded from direct exposure to solar radiation and the radiating qualities of the structure are maximized. For those missions where still further attenuation of radiation is necessary, a narrow band pass filter 56 may be swung into position to filter the solar flux 54 before it is intercepted by the convex reflectors 55. The filter 56 may be mounted in a support structure 57 hinged at 58 to the frame of the solar cell array and may be pivoted in the direction of the arrow by means not shown in the drawing into the active position illustrated.

Summarizing, the unique solar cell assemblies which are the subject of this invention offer remarkably effective and versatile cell cooling and sunlight concentrating features. The advantages achieved by this invention are due in part to the fact that cooling areas are interspersed between strips of solar cells in a manner which promotes their effectiveness as radiators of thermal energy. A coating on the reflector surfaces provides high emissivity in the infrared range but still permits high reflectance of the spectral range of solar radiation to which the energy converter cells are responsive.

The structures described herein maximize the power output obtainable from an array of solar cells to a remarkable extent. For example, analyses have shown that the cost per watt of electric power produced by a conventional solar cell array is at least three times the cost per watt of the electric power producable by solar cell assemblies of the nature described herein. For missions involving exposure to increasingly intense solar radiation, the cost advantage in favor of structures the type described herein is even greater.

It should be clear that the specific examples selected for illustration in the accompanying illustrations and described above are exemplary in nature and not necessarily limiting on the scope of the invention or the application of the herein-contained teachings.

It is to be expected that certain variations and modifications of the invention will occur to those skilled in the art to which the invention pertains. For example, to improve the emissivity of the solar cell array assembly with respect to thermal energies developed by the solar cells, the back surfaces of the corrugated panel may be blackened entirely or only in part, depending on the missions involved. As an illustration, if the structure shown in FIGURE 6 were intended for a lunar orbit, it might be desirable to provide a highly emissive coating on the back side of the reflectors only and to polish the underneath portions of the supporting web beneath the solar cells to a mirror luster. Such an arrangement would minimize absorption by the array of radiation from the moon when the array is between the moon and the sun and would, in such an environment, improve the cooling features of the structure. Since other variations and modifications are permissible, the appended claims are intended to cover all such variations and modifications as are within the true spirit and scope of this invention in its broader aspects.

What is claimed is:
1. A solar cell assembly comprising:
   a supporting frame;
   a first set of mutually parallel and offset structural webs supported on said frame;
   a plurality of radiant energy converter cells substantially covering one side of the webs in said first set, said cells being responsive to a predetermined spectral range of radiant energy wavelengths incident thereon to generate electric energy; and
   a second set of mutually parallel and offset webs interleaved between and joining one edge of each web in said first set to the nearest edge of the next adjacent web in said first set in a stairlike configuration with substantially equal included angles between connected webs in said first and second set;
   the webs in both of said sets being in thermally contacting relationship and formed of a material of high thermal conductivity for the distribution through the structure of both sets of webs of thermal energy developed by said converter cells, said converter cells being mounted on said first set of webs only.
2. A solar cell assembly comprising:
   a supporting frame;
   a first set of mutually parallel and offset structural webs supported on said frame;
   a plurality of radiant energy converter cells substantially covering one side of the webs in said first set, said cells being responsive to a predetermined spectral range of radiant energy wavelengths incident thereon to generate electric energy;
   a second set of mutually parallel and offset webs interleaved between and joining one edge of each web in said first set to the nearest edge of the next adjacent web in said first set in a stairlike configura- tion with substantially equal included angles between connected webs in said first and second set;

said webs in both sets being in thermally contacting relationship and formed of a metal of high thermal conductivity for the distribution through the structure of both sets of webs of thermal energy developed by said converter cells, said converted cells being mounted on said first set of webs only; and a coating on at least one side of the webs in said second set having relatively high emissivity for the radiation of thermal energy received by said webs from said converter cells.

3. A solar cell assembly comprising:

a supporting frame;

a first set of mutually parallel and offset structural webs supported on said frame;

a plurality of radiant energy converter cells substantially covering one side of the webs in said first set, said cells being responsive to a predetermined spectral range of radiant energy wavelengths incident thereon to generate electric energy;

a second set of mutually parallel and offset webs interleaved between and joining one edge of each web in said first set to the nearest edge of the next adjacent web in said first set in a stairlike configuration with substantially equal included angles between connected webs in said first and second set;

the webs in both of said sets being in thermally contacting relationship and formed of a metal of good thermal conductivity for the distribution through the structure of both sets of webs of thermal energy developed by said converter cells, said converter cells being mounted on said first set of webs only; and mirror surfaces on the one side of said second set of webs facing said converter cells across the included angle therebetween for reflecting radiant energy in said predetermined spectral range onto said converter cells.

4. A solar cell assembly comprising:

a supporting frame;

a first set of mutually parallel and offset structural webs supported on said frame;

a plurality of radiant energy converter cells substantially covering one side of the webs in said first set, said cells being responsive to a predetermined spectral range of radiant energy wavelengths incident thereon to generate electric energy;

a second set of mutually parallel and offset webs interleaved between and joining one edge of each web in said first set to the nearest edge of the next adjacent web in said first set in a stairlike configuration with substantially equal included angles between connected webs in said first and second set;

the webs in both of said sets being in thermally contacting relationship and formed of a metal of high thermal conductivity for the distribution through the structure of both sets of webs of thermal energy developed by, said converter cells, said converter cells being mounted on said first set of webs only;

mirror surfaces on the one side of said second set of webs facing said converter cells across the included angle therebetween for reflecting radiant energy in said predetermined spectral range onto said converter cells; and a coating on said mirror surfaces transparent to said spectral range of radiant energy and having relatively high emissivity for wavelengths of radiant energy longer than those in said spectral range.

5. A solar cell assembly comprising:

a supporting frame open on opposite sides;

a first set of mutually parallel and offset structural webs of equal lateral width supported within said frame;

a plurality of radiant energy converter cells substantially covering one side of the webs in said first set, said cells being responsive to a predetermined spectral range of radiant energy wavelengths incident thereon to generate electric energy;

a second set of mutually parallel and offset webs of equal lateral width interleaved between and joining one edge of each web in said first set to the nearest edge of the next adjacent web in said first set in a stairlike configuration with substantially equal included angles between connected webs in said first and second set;

the webs in both of said sets being in thermally contacting relationship and formed of a metal of high thermal conductivity for the distribution through the structure of both sets of webs of thermal energy developed by said converter cells, said converter cells being mounted on said first set of webs only;

mirror surfaces on the one side of said second set of webs facing said converter cells across the included angle therebetween for reflecting radiant energy in said predetermined spectral range onto said converter cells;

a coating on said mirror surfaces substantially transparent to radiant energy of wavelengths within said spectral range and having relatively high emissivity with respect to wavelengths of radiant energy longer than those in said spectral range; and a coating of relatively high emissivity on at least part of the surfaces on the other sides of said webs for exposure through said open frame.

References Cited

UNITED STATES PATENTS

| | | | |
|---|---|---|---|
| 2,625,930 | 1/1953 | Harris. | |
| 2,951,163 | 8/1960 | Shaffer et al. | 136—89 X |
| 3,152,926 | 10/1964 | Power | 136—89 |
| 3,232,795 | 2/1966 | Gillette et al. | 136—89 |

ALLEN B. CURTIS, *Primary Examiner.*